United States Patent
Rustad et al.

(10) Patent No.: US 6,187,125 B1
(45) Date of Patent: Feb. 13, 2001

(54) METHOD FOR PRODUCING A DEFLATION-PROOF PNEUMATIC TIRE AND TIRE FILLING COMPOSITION HAVING HIGH RESILIENCE

(75) Inventors: Norman E. Rustad, Seal Beach; Bhanubhai D. Patel, Buena Park; Juanito G. Santero, Lawndale, all of CA (US)

(73) Assignee: Arnco, South Gate, CA (US)

( * ) Notice: Under 35 U.S.C. 154(b), the term of this patent shall be extended for 0 days.

(21) Appl. No.: 09/288,362

(22) Filed: Apr. 8, 1999

Related U.S. Application Data

(63) Continuation-in-part of application No. 08/924,577, filed on Sep. 5, 1997, now abandoned.

(51) Int. Cl.$^7$ .................................................. B60C 7/00
(52) U.S. Cl. ......................... 156/112; 152/310; 152/313
(58) Field of Search ............................... 156/112, 113, 156/110.1, 115; 152/310, 313, 452, 516, 520; 252/182.22; 524/474, 479; 521/904

(56) References Cited

U.S. PATENT DOCUMENTS

| | | |
|---|---|---|
| Re. 29,890 | 1/1979 | Gomberg. |
| 3,648,748 | 3/1972 | Lovell. |
| 4,071,279 | 1/1978 | Chung. |
| 4,094,353 | 6/1978 | Ford. |
| 4,230,168 | 10/1980 | Kaneda et al. . |
| 4,416,844 | 11/1983 | Wyman. |
| 4,683,929 | 8/1987 | Wyman. |
| 5,070,138 | 12/1991 | Bulluck. |
| 5,402,839 | 4/1995 | Gupta. |

OTHER PUBLICATIONS

Standard Test Method for Rubber Property—Resilience Using a Rebound Pendulum, ASTM D1054–79.
Standard Test Method for Rubber Property—Resilience (Vertical Rebound), ASTM D2632–79.

Primary Examiner—Geoffrey L. Knable
(74) Attorney, Agent, or Firm—Coudert Brothers

(57) ABSTRACT

The present invention is directed to a method for producing a cured tire filling composition and the composition resulting from such a method. A mixture of a polyisocyanate having an average functionality of at least 2.3; a high molecular weight polyol having a hydroxyl number in the range of about 20 to about 31 and having an actual functionality of greater than 2.1; 6 to 65 weight percent of a polar plasticizing extender oil; and no greater than 0.5 weight percent polyamine is cured in the presence of a catalyst to form a polyurethane elastomer having a vertical rebound of greater than about 60% based on ASTM D2632 and a Durometer hardness in the range of about 5 to 60 (Shore A). The mixture is used to fill a tire prior to curing the composition within the tire casing and results in a deflation-proof tire that has considerably longer road testing life than tire filling compositions currently available.

18 Claims, 2 Drawing Sheets

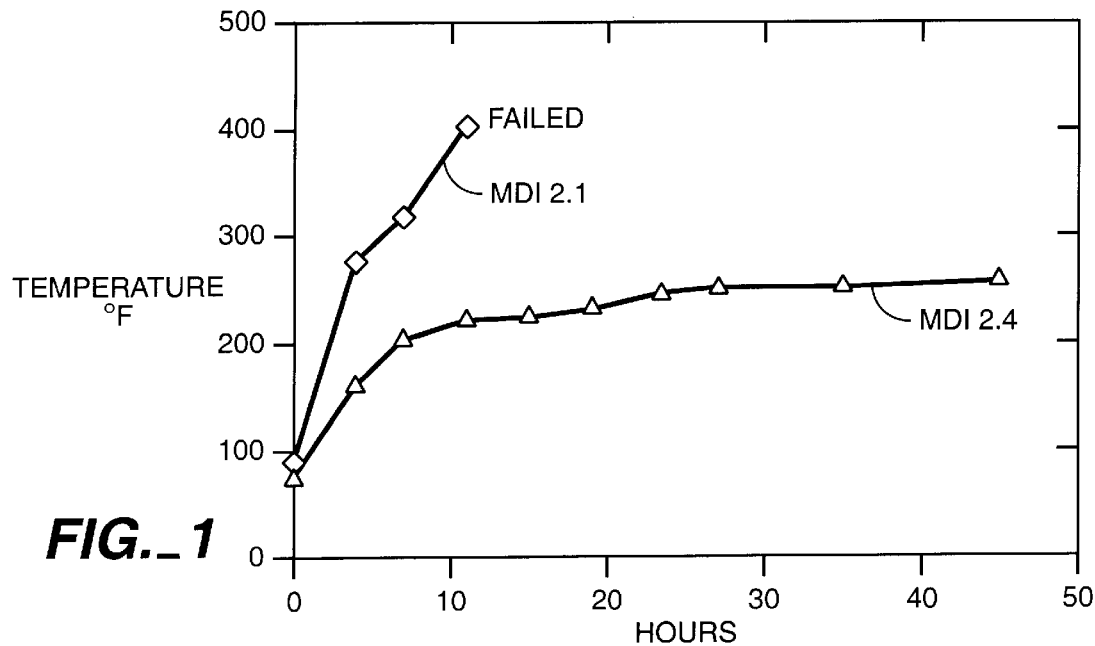
FIG._1
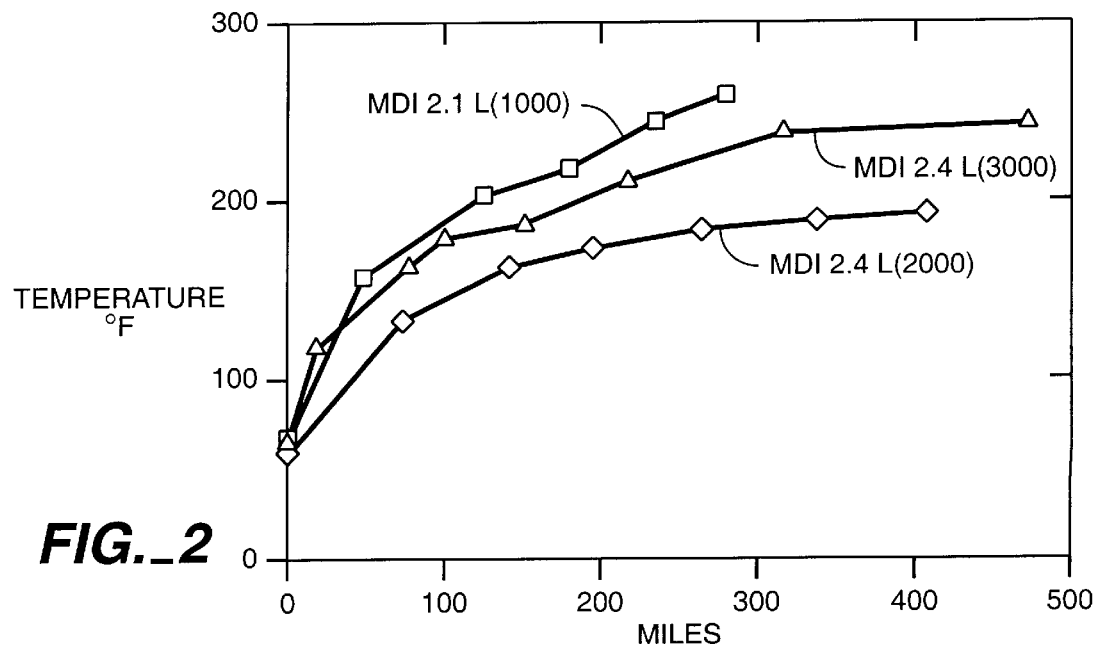
FIG._2

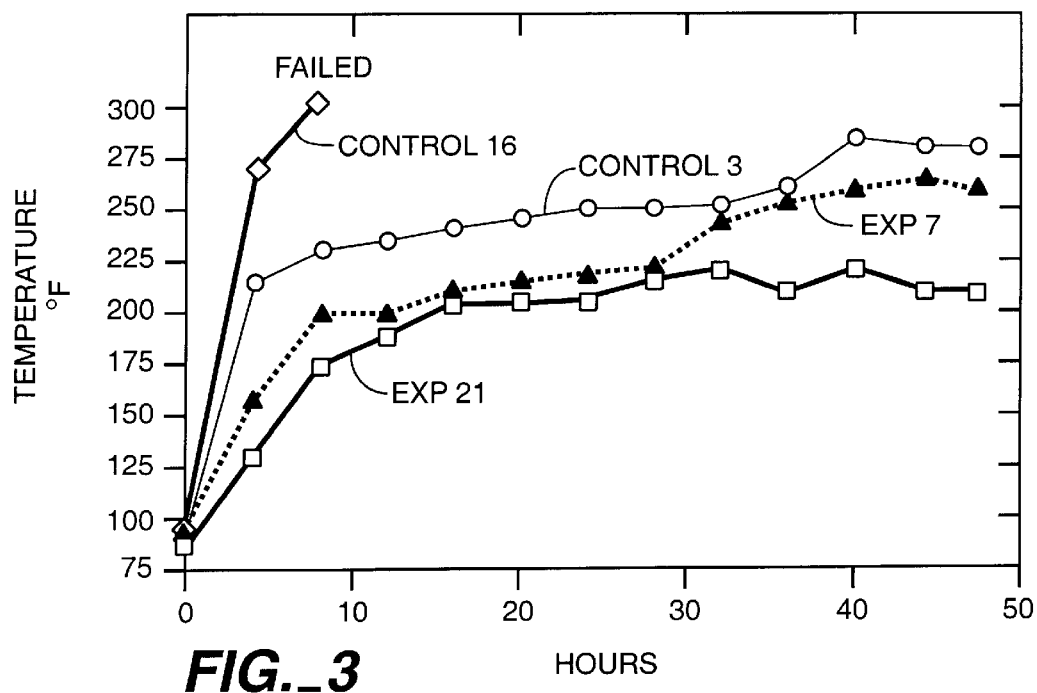
FIG._3
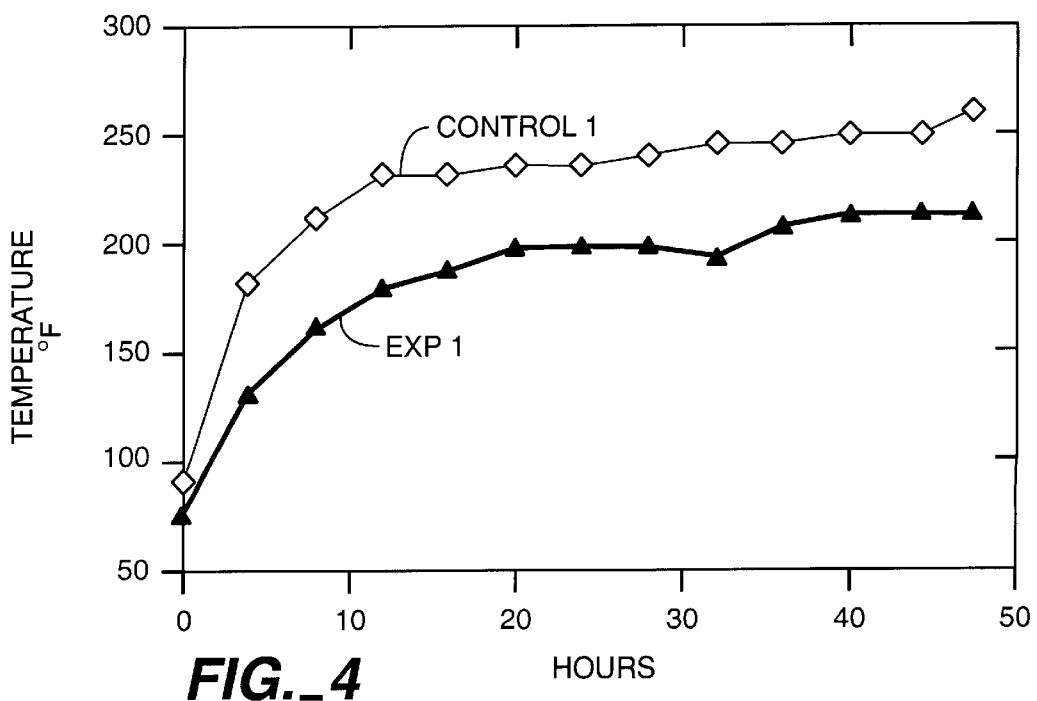
FIG._4

US 6,187,125 B1

METHOD FOR PRODUCING A DEFLATION-PROOF PNEUMATIC TIRE AND TIRE FILLING COMPOSITION HAVING HIGH RESILIENCE

This application is a continuation-in-part of application Ser. No. 08/924,577, filed Sep. 5, 1997, now abandoned.

FIELD OF THE INVENTION

The present invention relates polymer-filled pneumatic tires. More particularly, this invention relates to cured filling compositions of diphenylmethane diisocyanate (MDI)—containing polyurethane elastomers having a high resilience and tailored hardness depending on the specific end use application and a method for producing deflation-proof tires containing the cured filling compositions.

BACKGROUND OF THE INVENTION

The pneumatic tire has proven its worth in providing a comfortable ride with load carrying capabilities for automobiles, trucks, aircraft, and other vehicles. However, the tire carcass is susceptible to punctures which causes the tire to go flat rendering it unusable. A tire suddenly going flat can be life threatening as well as inconvenient and cause financial loss in industrial applications.

Very soft polyurethane elastomer-filled, deflation-proof pneumatic tires were developed beginning in the 1970's to reduce the downtime caused by flats in many industrial applications. A few of the prior art references in this field include: Gomberg, U.S. Pat. No. Reissue 29,890; Wyman, U.S. Pat. No. 4,416,844; Wyman, U.S. Pat. No. 4,683,929; Ford, U.S. Pat. No. 4,094,353; Kaneda, et al., U.S. Pat. No. 4,230,168; Bulluck, U.S. Pat. No. 5,070,138; and Gupta, U.S. Pat. No. 5,402,839. The Gupta patent is directed to polyurea-containing polyurethane elastomer filling materials having at least 1.00 weight percent aromatic polyamines.

Although the polyurethane filling materials give a harder ride than air, and add, in some cases, tremendous weight to the vehicle, the availability of deflation-proof tires is economically practical for many applications, such as, mining, scrap yards, military, and heavy construction.

Since air is negligible in weight and essentially free, the raw materials used in the compositions to fill the tires and to create the extra weight have to be inexpensive to make deflation-proof tires practical. Usually a two component system is meter-mixed together at a 1 to 1 ratio with basic pumping equipment through a static mixer as it is pumped into the tire to cure the mixture to a soft elastomer. Although polyurethane filling systems can be more expensive than other rubber materials, they can be formulated easily to a 1 to 1 ratio, can be made inexpensive by blending with high levels of plasticizing process oils and can have good performance properties.

Because many industrial applications require the filled tires to withstand high load carrying without large tire deflection and minimum heat buildup in the tire, the elastomer in the tire has to be very resilient and have a very low hysteresis or very low internal friction properties. Under extreme conditions, the core of the filled tire should not reach temperatures greater than 300° F. and maintain an equilibrium temperature of less than 300° F. The drawbacks of the current commercially available polyurethane filling compositions are they have only adequate resilience and hysteresis.

Most of the tire filling systems in the world today use toluene diisocyanate (TDI) because it is inexpensive, liquid, and relatively easy to work with. However, TDI has a high vapor pressure and like all isocyanates has a threshold limit for toxicity. If methylene diphenylisocyanate (MDI) could be used, it would be the preferred isocyanate because it has a much lower vapor pressure than TDI and is subjected to less environmental restrictions. While it is true a number of prior art references disclose and claim the use of MDI in tire filling compositions, such compositions have generally not had good enough performance to be commercially acceptable. Therefore, even though MDI is preferred from an environmental standpoint, few commercially acceptable polyurethane-filled pneumatic tires contain MDI. For example, some of the MDI-containing formulations that failed road testing had excellent tensile-tear properties, but the resilience or vertical rebound as measured by the ASTM D 2632-79 test, also known as the Bashore Rebound test, was inferior, i.e., resilience in the range of 46–53%. In general, the road test consisted of placing the filled tires on a pickup truck with a given load and driving the truck at a given range of speed for a finite distance. More definitely, the standardized simulated road test FMVSS (Federal Motor Vehicle Safety Standard) #119 Durability Test can be used. The specific conditions for such a road test are set forth under the Description of the Preferred Embodiments of the Invention. All of the tires filled with a prior art filling composition failed as a result of an increase of temperature indicating abnormal heat buildup because of the higher than normal hysteresis properties of the filling compositions.

Kaneda et al., U.S. Pat. No. 4,230,168 discloses and claims tire filling elastomers of polyoxypropylene polyols having an OH equivalent weight of 900 to 1800 and a functionality of 2 to 4, a polyisocyanate including MDI, and a chlorinated paraffin or dialkyl phthalate plasticizer miscible with the polyol. Such elastomeric filling materials are reported to have high resilience, as measured by a Dunlop-Resilience Tester, and low JIS hardness. This reference teaches that when attempts were made to improve the riding comfort of the filled tire by lowering the hardness of the filling material using a method that decreases the equivalent ratio of isocyanate groups to hydroxyl groups in the composition, the resilience is disadvantageously lowered. The Kaneda et al. reference also teaches against going outside the claimed range of OH equivalent weight for the polyols because the resilience of the tire filler is poor if the OH equivalent weight is below 900 or above 1800.

Toluene diisocyanate (TDI) has been the isocyanate of choice used in the polyurethane elastomer compositions not only for the foregoing reasons but it also has the advantage of more favorable economics when compared with MDI compositions. The polyurethane elastomers, which are currently commercially available for tire deflation-proofing applications containing TDI, have performed well under most conditions. However, when extreme loading is necessary, these systems will develop high internal heat and degrade causing tire failure. The resiliency of these systems is about 50% by the Bashore Rebound test. If resiliency could be improved, there would be greater stability of the tire filling systems under higher stress because there would be less heat created in the tires.

There is a great need for an MDI-containing tire filling formulation that has adequate tensile-tear properties and low hysteresis, without the tendency for excessive heat buildup. There is also a need for a relatively inexpensive MDI-containing tire filling formulation that has higher resilience over a wide range of hardness than current commercially available formulations.

SUMMARY OF THE INVENTION

The present invention is directed to a catalytically cured filling composition comprising a polyisocyanate having an average functionality of about 2.3, or greater, a high molecular weight polyol or blend of polyols having a hydroxyl numbers in the range of about 20 to about 31 and having an actual functionality of greater than 2.1; 6 to about 65, preferably about 20 to about 65, weight percent polar plasticizing extender oil having a % H below 10.00, and no greater than weight 0.5% polyamine, in the presence of a catalyst to form a polyurethane elastomer. The polyisocyanate used in the present invention is a polymeric diphenylmethane diisocyanate (polymeric MDI) by itself or blended with either diphenylmethane diisocyanate or a modified diphenylmethane diisocyanate. The isocyanate is present in the range of about 3 to about 15 weight percent.

The present invention provides an unique way of using certain polymeric MDI species to make a novel series of soft polyurethane elastomers for tire deflation-proofing that have a very high degree of resiliency. This high resilience gives the elastomer a very low hysteresis and prevents the filled tire from developing a high heat buildup at the core of the tire to cause degradation of the filling composition and eventual tire failure.

By using polymeric MDI with a functionality of about 2.3 or greater, in combination with a high molecular weight polyol or a blend of polypropylene glycol polyols capped with ethylene oxide having a OH number between 20 and 31 and a functionality of greater than 2.1, and a plasticizing polar oil, a soft polyurethane with a Bashore resilience of greater than 60% based on the Standard Test Method for Rubber Property—Resilience (Vertical Rebound), ASTM D2632 can be obtained. The hardness of the elastomer will range from 5 to 60, and more preferably 10 to 60, Durometer Shore A, depending upon the level of isocyanate and plasticizing oil that is used. The plasticizing process oil level can be between 6% and 65% with the upper level being restricted by the compatibility of the plasticizing oil. Too much oil will cause the elastomer to bleed which will be detrimental to the function of the filled tire. Because the oil is the least expensive of the major components of the system, the more oil in the system without detrimental properties, the better the economics of the fill system. The plasticizing oil is a blend of specific petroleum process oils and polyester plasticizers at a level that gives the highest degree of compatibility. Ideally, at a given hardness, the system with the highest level of oil and highest Bashore Rebound will be most practical. Other components, such as, low molecular weight diols and triols are added to obtain higher hardness in the system. Small amounts of polyamines, i.e., no greater than 0.5 weight %, more preferably no greater than 0.4 weight % based on the total weight of the composition such as, meta-phenylene diamine and water are added to develop greater strength in the elastomer. However, no polyamines are present in the compositions of the preferred embodiment of the present invention as discussed in detail below.

The present invention is also directed to a method for producing a deflation-proof tire which includes filling a pneumatic tire casing with the foregoing components in the presence of a catalyst to form a polyurethane elastomer and curing the elastomer to produce the cured elastomeric filling composition of the present invention within the casing.

BRIEF DESCRIPTION OF THE FIGURES

Further features and advantages become apparent from the following description of the preferred embodiments of the invention as illustrated in the accompanying figures in which:

FIG. 1 is a graph of the increase in temperature versus the hours to failure for a tire with a control fill composition containing polymeric MDI having a 2.1 functionality (MDI 2.1) compared with the hours without failure for a tire with a fill composition of the present invention containing polymeric MDI having a 2.4 functionality (MDI 2.4) under standardized testing;

FIG. 2 is a graph of the increase in temperature versus the number of miles of road testing of a tire with the MDI 2.1—containing control fill composition mounted on a pickup truck with a light load of 1,000 pounds compared to a tire with the MDI 2.4—containing composition of the present invention mounted on the same type of pickup truck with twice and three times the load used in the control road test;

FIG. 3 is a graph comparing the temperature profiles of four flat-proofing compositions in tires tested according to FMVSS#119. The formulations are Control 16 using a 2.1 functionality MDI, Control 3 using the best performing commercially available TDI system, Example 7 using a fill composition of the present invention with a 2.4 functionality MDI and containing 0.35% polyamine, and Example 21 using a fill composition of the present invention and containing no polyamine.

FIG. 4 is a graph comparing the temperature profiles of a soft fill composition of a commercially available TDI system, Control 1 and Example 2, a soft fill composition of the present invention using 2.4 functionality MDI and containing 0.2% polyamine Example 1.

DESCRIPTION OF THE PREFERRED EMBODIMENTS OF THE INVENTION

The polymeric diphenylmethane diisocyanate, alone or blended with diphenylmethane diisocyanate or polymeric diphenylmethane diisocyanate in the composition of the present invention must be of at least medium functionality. It has been found that a polyisocyanate having an average functionality of as low as about 2.3 can be used. Commercially available polymeric MDI that can be used include: PAPI 2027, PAPI 2901, and PAPI 2094 supplied by Dow; RUBINATE M, RUBINATE 1820, and RUBINATE 9041 supplied by ICI; MONDUR MR, MONDUR MR-5, MONDUR MRS, MONDUR MRS-5, MONDUR MRS-4, and MONDUR E582 supplied by Bayer; and LUPRANATE M-20, and LUPRANATE M-10 supplied by BASF.

In order to reduce cost and to produce low hardness-polyurethane elastomers, plasticizing extender oil blends are used in the compositions of the present invention. In general, plasticizing extender oils are any of the process oils commonly used to extend polymers that are compatible with the cured urethane elastomers. If an extender oil is removed from a formation, the hardness of the elastomer can increase by a factor of four. The preferred extender oils are substantially aromatic, contain polar compounds and are designated as aromatic extract oils. Less polar extender oils, those that contain lesser amounts of an aromatic and polar compounds, or even non-polar extender oils, can be blended with the polar extender oils so that the resulting blend has at least slight polarity and is compatible with the cured polyurethane elastomer. Commercially available naphthenic and paraffinic process oils with high levels of aromatic and polar compounds are sold by Witco Corporation under the trademarks CALIFLUX and BEARFLEX, Sun Company under the trademark SUNDEX, Shell Oil Company under the trademark DUTREX, BP Oil Company under the trademark ENERFLEX, and Crowley Chemical Company under the trademark VIPLEX.

Diester plasticizers such as dioctyl phthlate, KODAFLEX TXIB sold by Eastman Chemical Company, SANTICIZER 160 sold by Monsanto, and BENZOFLEX 9-88 sold by Velsicol Chemical Corporation are a few examples of polar compounds that can be used with the process oils to improve compatibility and performance of the extender oil blends with the urethane elastomers of the present invention.

The polyols useful in the filling composition of the present invention include a variety of high molecular weight hydroxy (OH) terminated polyethers having hydroxyl numbers in the range of 20 to 31 or a hydroxyl equivalent weight in the range of 1810 to 2805 and having an actual functionality of at least 2.1. The hydroxyl number for the polyol is defined as the amount of KOH, in milligrams, equivalent to the free hydroxyl groups present in 1 gram of a polymer. Preferred polyols are the polyoxyalkylene polyols having 2–4 hydroxyl groups and where the alkylene group has 2–6 carbon atoms. A large variety of an alkylene oxide, such as ethylene oxide, propylene oxide, or polymerization of butylene oxide with a glycol. Polyethers having higher functionality may be obtained by the reaction with a triol or higher polyol, such as glycerine, trimethylol propane, and pentaerythritol. Polyols of the above types are available commercially, for example under the VORANOL trademark from Dow Chemical Company, ARCOL and ACCLAIM trademarks from ARCO Chemical Company (now LYONDELL Chemical Company), POLY-G trademark from Olin Chemical Company, MULTRANOL trademark from Bayer Corporation, and PLURACOL and PLURACOL HP trademark from BASF Corporation.

The OH equivalent weight is defined by the following equation:

$$\text{OH Equivalent Weight} = \frac{56100}{\text{OH Number}}$$

Where: "OH Equivalent Weight" is defined by the molecular weight of the polyol divided by the number of hydroxyl groups. Therefore, a triol having a molecular weight of 5430 has an OH equivalent weight of 1810 and a hydroxyl number of 31.

In particular, a predominately polypropylene oxide triol having a molecular weight about 6000 is most suitable. Such a triol is completely outside the range of acceptable polyols required for use in the tire filling composition of the Kaneda, et al. reference discussed under the Background of the Invention section. It is surprising that the Kaneda, et al. tire fill compositions have resilience values as high as 92.7% based on a Dunlop-Resilience Tester, yet such compositions are not commercially available. The Dunlop-Resilience Test is described in Standard Test Method for Rubber Property—Resilience Using a Rebound Pendulum, ASTM D1054-79. A pendulum rebound resilience calculates to about the low end of the vertical rebound resilience of the tire fill compositions of the present invention. One explanation for the fact that no commercially tire fill compositions are known to exist despite the relatively high resiliency of the tire fill compositions disclosed in the Kaneda, et al. patent, which issued over 15 years ago, is that they require the use of chlorinated paraffin or dialkyl phthalate plasticizers making such compositions prohibitively expensive.

The composition of the present invention can include up to about 10% weight of a low molecular weight diol and/or triol, having a OH equivalent weight of less than 300. Examples of such commercially available low MW polyols are ethylene glycol, diethylene glycol, dipropylene glycol, phenyl diethanolamine, REZOL EPO 225 sold by Witco Chemical Company, MP diol, neopentyl glycol, trimethylol propane, glycerine, VORANOL 230-660 sold by Dow Chemical Company, PLURACOL TP440 sold by BASF Corporation, and POLY-G 20-265 sold by Olin Chemical Company.

If small amounts of polyamines are included in the compositions of the present invention, aromatic polyamines can be used and include, but are not limited to, methylene orthochlorodiamine, methylene dianiline, meta-phenylenediamine, VERSALINK C-138 sold by Air Products and Chemicals, UNILINK 4200 sold by UOP Chemical Company, and diethyl toluenediamine.

A catalyst is added to promote the rate of cure to provide a reasonable pot life and a reasonable cure rate at ambient temperatures, approximately 70° F. Any of the catalysts known in the production of polyurethane foam can be used. Examples include tertiary amine catalysts, or dibutyltin dilaurate or other organotin catalysts. A high performance organotin catalyst that has been used in curing the compositions of the present invention is FORMREZ UL-22 sold by Witco Chemical Company.

CONTROLS 1–16 AND EXAMPLES 1–20

The controls and examples and discussion which follow further illustrate the superior performance of the tire filling compositions of the present invention compared with those of the prior art. The controls and examples are for illustrative purposes and are not meant to limit the scope of the claims in any way. The tire filling compositions of each of the controls and examples consisted of a two component mixture. One component was an isocyanate component of premixed materials and the second component was a polyol blend. The isocyanate and polyol blend components were metered at a 1 to 1 by volume ratio and mixed through a static mixer as the two component mixture was pumped into a tire to set up and cure at room temperature over a period of several days. Each component was made by proportionately blending the specific amounts of the materials listed in the Tables 1–4 below. Tables 1–2 summarizes Examples 1–22 illustrating the preferred and practical embodiments of the present invention. Tables 3 and 4 summarize the Controls 1, 2, 3, 3A, 3B, 4–16 illustrating tire filling compositions outside the scope of the present invention.

The following tabulates the specific materials used in each of the isocyanate and polyol blend components listed in Tables 1–4 below:

Polyol A: 6000-6500 MW ARCOL E–785 triol supplied by ARCO
Polyol B: 4000 MW ACCLAIM 4220 diol supplied by ARCO
Polyol C: 6000-6500 MW ACCLAIM 6320 triol supplied by ARCO
Isocyanate A: 2.4 functionality RUBINATE 9041 polymeric MDI supplied by ICI
Isocyanate B: 2.7 functionality RUBINATE M polymeric MDI supplied by ICI
Isocyanate C 2.4 functionality RUBINATE 1820 polymeric MDI supplied by ICI
Isocyanate D: 2.1 functionality ISONATE 2143 L Liquid MDI supplied by Dow
Isocyanate E: Toluene Diisocyanate 80/20
Isocyanate F: 2.3 functionality ISONATE P2901 polymeric MDI supplied by Dow
Plasticizer A: Texanol Isobutyrate (TXIB) supplied by Eastman Company Plasticizer B: VIPLEX 530-A Process oil supplied by Crowley Oil Company
Plasticizer C: CALIFLUX LP Process oil supplied by Witco Chemical Company
Plasticizer D: Diethylhexyl Terephthalate
Polyamine: meta-Phenylene diamine
Low MW diol: Diethylene Glycol
Low MW triol: VORANOL 230-660 supplied by Dow
Low MW diol 2: REZOL EPD 225 supplied by Witco
Low MW triol 2: PLURACOL TP440 supplied by BASF
Catalyst: FORMREZ UL-22 supplied by Witco
Hardness: Shore A
Rebound: Bashore

TABLE 1

| | Examples | | | | | | | | | | |
|---|---|---|---|---|---|---|---|---|---|---|---|
| | 1 Wt. % | 2 Wt. % | 3 Wt. % | 4 Wt. % | 5 Wt. % | 6 Wt. % | 7 Wt. % | 8 Wt. % | 9 Wt. % | 10 Wt. % | 11 Wt. % |
| Isocyanate Component | | | | | | | | | | | |
| Polyol A | 15 | | | 15 | 15 | 15 | 20 | 20 | 25 | 20 | 20 |
| Polyol B | | 15 | 15 | | | | | | | | |
| Isocyanate A | 10 | 10 | 10 | 10 | 10 | 13 | 19 | | | 19 | 19 |
| Isocyanate B | | | | | | | | 19 | | | |
| Isocyanate C | | | | | | | | | 20 | | |
| Plasticizer A | 5 | 5 | 75 | | | 5 | 5 | 5 | 5 | 61 | 5 |
| Plasticizer B | 70 | 70 | | 70 | | | 56 | 56 | 50 | | 56 |
| Plasticizer C | | | | | | 67 | | | | | |
| Plasticizer D | | | | 5 | 75 | | | | | | |
| Polyol Component | | | | | | | | | | | |
| Polyol A | 50 | 55 | 55 | 55 | 55 | 55 | 43 | 43 | 38 | 43 | 73 |
| Polyamine | 0.4 | 0.4 | 0.4 | 0.4 | 0.4 | 0.4 | 0.7 | 0.7 | 0.7 | 0.7 | 0.7 |
| Added Water | 0.3 | 0.3 | 0.3 | 0.25 | 0.25 | 0.26 | 0.25 | 0.25 | 0.3 | 0.25 | 0.25 |
| Low MW diol | | | | | | | 2.2 | 2.2 | 2.2 | 2.2 | 2.2 |
| Low MW triol | | | | | | | 3.55 | 3.55 | 3.6 | 3.55 | 3.55 |
| Plasticizer A | | | 44.285 | | | 20 | | | | 50.295 | |
| Plasticizer B | 49.285 | 44.285 | | 44.32 | | | 50.295 | 50.295 | 55.195 | | 20.295 |
| Plasticizer C | | | | | | 24.32 | | | | | |
| Plasticizer D | | | | | 44.32 | | | | | | |
| Catalyst | 0.015 | 0.015 | 0.015 | 0.03 | 0.03 | 0.02 | 0.005 | 0.005 | 0.005 | 0.005 | 0.005 |
| Results | | | | | | | | | | | |
| Isocyanate-Polyol Mix Ratio by Wt. | 50.3/49.7 | 50.6/49.4 | 50/50 | 50/50 | 50/50 | 47.4/52.8 | 51.50 | 51/50 | 51/50 | 51/50 | 51/50 |
| Hardness | 16 | 15 | 10 | 18 | 20 | 17 | 35 | 35 | 35 | 26 | 45 |
| Rebound | 63 | 60 | 65 | 65 | 73 | 65 | 65 | 67 | 65 | 64 | 65 |

TABLE 2

| | Examples | | | | | | | | | | |
|---|---|---|---|---|---|---|---|---|---|---|---|
| | 12 | 13 | 14 | 15 | 16 | 17 | 18 | 19 | 20 | 21 | 22 |
| | Wt. % | Wt. % | Wt. % | Wt. % | Wt. % | Wt. % | Wt. % | Wt. % | Wt. % | Wt. % | Wt. % |
| Isocyanate Component | | | | | | | | | | | |
| Polyol A | 20 | 20 | 20 | 66.1 | 30 | 20 | 20 | 20 | 16.2 | 14.3 | 9.3 |
| Polyol B | | | | | | | | | | | |
| Isocyanate A | 19 | 19 | 19 | 18.9 | 19 | 19 | 19 | 19 | | | |
| Isocyanate B | | | | | | | | | | 12.6 | 7.5 |
| Isocyanate C | | | | | | | | | | | |
| Isocyanate D | | | | | | | | | | | |
| Isocyanate E | | | | | | | | | | | |
| Isocyanate F | | | | | | | | | 12.6 | | |
| Plasticizer A | 5 | 5 | 5 | 15 | 5 | 5 | 5 | 5 | | | |
| Plasticizer B | 34 | 30 | 40 | | 5 | 56 | 56 | 56 | 71.2 | 73.1 | 83.2 |
| Plasticizer C | 22 | | | | 46 | | | | | | |
| Plasticizer D | | | | | | | | | | | |
| Polyol Component | | | | | | | | | | | |
| Polyol A | 43 | 43 | 43 | 98.895 | 53 | 43 | 43 | 43 | 69.5 | 6 | 30 |
| Polyol C | | | | | | | | | | 50 | 30 |
| Polyamine | 0.7 | 0.7 | 0.7 | 0.7 | 0.7 | | 0.7 | 0.7 | | | |

TABLE 2-continued

| | Examples | | | | | | | | | | |
|---|---|---|---|---|---|---|---|---|---|---|---|
| | 12 | 13 | 14 | 15 | 16 | 17 | 18 | 19 | 20 | 21 | 22 |
| | Wt. % | Wt. % | Wt. % | Wt. % | Wt. % | Wt. % | Wt. % | Wt. % | Wt. % | Wt. % | Wt. % |
| Added Water | 0.25 | 0.3 | 0.3 | 0.3 | 0.3 | 0.3 | | 0.3 | 0.5 | 0.3 | 0.2 |
| Low MW diol | 2.2 | 2.2 | 2.2 | | 1.9 | 2.5 | 2.2 | | | 1.3 | |
| Low MW triol | 3.55 | 3.55 | 3.55 | | 3.05 | 4.1 | 3.55 | | | | |
| Low MW diol 2 | | | | | | | | 10.35 | | | |
| Low MW triol 2 | | | | | | | | 5.88 | | | |
| Plasticizer A | | | | | | | | | | | |
| Plasticizer B | 30 | | | | | 50.095 | 50.545 | 39.765 | 30 | 42.38 | 39.78 |
| Plasticizer C | 20.295 | | | | 41.045 | | | | | | |
| Plasticizer D | | | | | | | | | | | |
| Catalyst | 0.005 | 0.005 | 0.005 | 0.005 | 0.005 | 0.005 | 0.005 | 0.005 | 0.005 | 0.02 | 0.02 |
| Results | | | | | | | | | | | |
| Isocyanate-Polyol Mix Ratio by Wt. | 51/50 | 65/50 | 74/50 | 38.5/50 | 51/50 | 51/50 | 51/50 | 51/50 | 50/50 | 49/50 | 49/50 |
| Hardness | 31 | 58 | 36 | 38 | 32 | 31 | 34 | 32 | 32 | 30 | 13 |
| Rebound | 66 | 60 | 61 | 66 | 64 | 66 | 61 | 65 | 62 | 73 | 71 |

TABLE 3

| | Controls | | | | | | | | |
|---|---|---|---|---|---|---|---|---|---|
| | 1 Wt. % | 2 Wt. % | 3 Wt. % | 3A Wt. % | 3B Wt. % | 4 Wt. % | 5 Wt. % | 6 Wt. % | 7 Wt. % |
| Isocyanate Component | | | | | | | | | |
| Polyol A | 43 | 30 | 32 | | 15 | | | | |
| Polyol B | | | | 15 | | 15 | 15 | 15 | 15 |
| Isocyanate A | | | | | | 10 | 10 | 10.5 | 10 |
| Isocyanate D | | | | 10.5 | 10.5 | | | | |
| Isocyanate E | 8 | 9 | 9.5 | | | | | | |
| Isocyanate F | | | | | | | | | |
| Plasticizer A | 3 | 3 | | 5 | 5 | | 5 | 5 | 5 |
| Plasticizer B | | 58 | | 69.5 | 69.5 | | | | |
| Plasticizer C | 46 | | 58.5 | | | | 70 | 69.5 | 70 |
| Polyol Component | | | | | | | | | |
| Polyol A | 28 | 35 | 54 | 55 | 55 | 55 | 55 | 60 | 50 |
| Polyamine | 0.65 | 1.25 | 1.2 | 0.4 | 0.4 | 0.4 | 0.4 | 0.4 | 0.4 |
| added Water | 0.25 | 0.3 | 0.3 | 0.25 | 0.25 | 0.3 | 0.3 | 0.3 | 0.25 |
| Low MW diol | | | | | | | | | |
| Low MW triol | | 0.5 | | | | | | | |
| Plasticizer A | | | | | | | | | |
| Plasticizer B | | 62.75 | | 44.282 | 44.33 | | | | |
| Plasticizer C | 70.8 | | 44.3 | | | | 44.285 | 39.435 | 49.335 |
| Catalyst | 0.3 | 0.2 | 0.2 | 0.018 | 0.02 | 0.03 | 0.015 | 0.015 | 0.015 |
| Results | | | | | | | | | |
| Isocyanate-Polyol Mix Ratio by Wt. | 51.1/50 | 51/50 | 51/50 | 51/50 | 51/50 | 25/55.73 | 51/50 | 51/50 | 50/50 |
| Hardness | 10 | 35 | 30 | 10 | 13 | 48 | Oil Bleed | 13 | Oil Bleed |
| Rebound | 48 | 50 | 50 | 45 | 49 | 57 | | 55 | |

TABLE 4

|  | Control | | | | | | | | |
|---|---|---|---|---|---|---|---|---|---|
|  | 8 Wt. % | 9 Wt. % | 10 Wt. % | 11 Wt. % | 12 Wt. % | 13 Wt. % | 14 Wt. % | 15 Wt. % | 16 Wt. % |
| Isocyanate Component | | | | | | | | | |
| Polyol A |  |  | 20 | 20 | 20 | 16.2 | 70 | 20 | 21.6 |
| Polyol B | 15 | 15 |  |  |  |  |  |  |  |
| Isocyanate A | 13 | 10 |  |  | 19 |  | 20 | 19 |  |
| Isocyanate D |  |  | 20 | 19 |  |  |  |  | 19.9 |
| Isocyanate E |  |  |  |  |  |  |  |  |  |
| Isocyanate F |  |  |  |  |  | 12.6 |  |  |  |
| Plasticizer A | 5 |  | 5 | 5 |  |  | 10 | 5 |  |
| Plasticizer B |  | 75 | 55 | 56 |  |  |  |  |  |
| Plasticizer C | 67 |  |  |  |  | 71.2 |  | 56 | 58.5 |
| Polyol Component | | | | | | | | | |
| Polyol A | 55 | 50 | 43 | 43 | 43 | 69.5 | 98.995 | 43 | 64 |
| Polyamine | 0.4 | 0.4 | 0.7 | 0.7 | 0.7 |  |  | 0.7 | 0.9 |
| Added Water | 0.3 | 0.3 | 0.3 | 0.25 | 0.3 | 0.5 | 0.3 | 0.25 | 0.29 |
| Low MW diol |  |  | 2.2 | 2.2 | 2.2 |  |  | 2.2 | 1.7 |
| Low MW triol |  |  | 3.55 | 3.55 | 3.55 |  |  | 3.55 |  |
| Plasticizer A | 10 |  |  |  |  |  |  |  |  |
| Plasticizer B |  | 49.285 | 49.945 | 50.295 |  |  |  |  |  |
| Plasticizer C | 34.28 |  |  |  |  | 30 |  | 50.295 | 33.135 |
| Catalyst | 0.02 | 0.015 | 0.005 | 0.005 | 0.005 | 0.005 | 0.005 | 0.005 | 0.015 |
| Results | | | | | | | | | |
| Isocyanate-Polyol Mix Ratio by Wt. | 47.8/52.2 | 50.3/49.7 | 51/50 | 51/50 | 39/49.755 | 50/50 | 35.5/50 | 51/50 | 51/50 |
| Hardness | 18 | Oil Bleed | 25 | 22 | 73 | 20 | 35 | Oil Bleed | 30 |
| Rebound | 57 |  | 53 | 52 | 51 | 55 | 59 |  | 46 |

In order for a tire filling system to be economically practical, it has to be inexpensive as well as perform under severe service conditions. Besides the raw materials having to be inexpensive, the process for putting the raw materials into the tires has to be very simple and inexpensive. This requires very basic equipment that meters at a 1 to 1 ratio, and a two component system that has both components, the isocyanate side and the polyol side, at a reasonably low viscosity at processing temperatures. Most tire filling operations are required to maintain a temperature of at least 70° F. for pumping and curing. A reasonable viscosity is set at 1500 cps, or less, and more practically at 1000 cps, or less. While a polyol having an equivalent weight of greater than 1810 is required to obtain good performance properties, it is necessary to use a plasticizing material to maintain a 1 to 1 ratio, a low hardness, and low viscosities for both the isocyanate and polyol components. Refer to Control 12 for a tire fill composition that has a Shore A hardness that is outside the acceptable norm.

Controls 1, 2 and 3 are representative of the composition of typical TDI tire filling systems that are used industrially. Their rebounds were found to be at a typical industrial standard of about 50%.

In accordance with the present invention to get a Bashore resiliency greater than 60% using a Bashore Resiliometer, polymeric MDI with a functionality of about 2.3, or greater, was found to be necessary, in combination with a high MW polypropylene glycol polyol blend and a compatible plasticizing polar extender oil. Controls 3A, 3B, 10, 11 and 16 show the inferior rebound of the elastomers made with a MDI polyisocyanate having a functionality of less than about 2.3; i.e., show the effect of using ISONATE 2143 L polyisocyanate having a functionality 2.1. On the other hand, compare the results obtained from Examples 1–11 on Table 1 and Examples 12–22 on Table 2, all the tire fill compositions were made with polymeric MDI having a functionality of about 2.3, or greater. They all have excellent resiliency as shown by Bashore rebounds of greater than 60%.

To obtain adequate resiliency in polyurethane elastomers, it is known in the art that a high molecular weight polyol is preferred. A polyol having a hydroxyl number approximately 28 would be a 6000 MW triol or a 4000 MW diol. A polypropylene glycol polyol (PPG) with ethylene oxide capping is used for economic and performance reasons. Because a standard PPG diol with a MW of 4000 cannot be made with a functionality near 2, a 4000 MW diol, made with newly developed technology by BASF and ARCO, was used. A standard 6000 MW triol can be made and is used but the actual functionality is about 2.2–2.4 rather than 3. A 6000 MW triol with a functionality of approximately 2.9 can be made with the new technology and can be used. When the 4000 diol is used at a low level with the 6000 triol, an actual functionality of approximately 2.1–2.2 is obtained.

To produce soft elastomers, i.e. having a Shore A between 5 and 60, and maintain a 1 to 1 ratio, a plasticizing material has to be used in either the isocyanate component or both the isocyanate and polyol components. The preferred plasticizing materials are either naphthenic, paraffinic, or catalytically cracked process oils because they are priced 2–5 times cheaper than the diester plasticizers. However, low levels of these diester plasticizers are necessary to improve compatibility of the more aliphatic oils. The more plasticizing process oils that can be used and still maintain performance, the less expensive the system. CALIFLUX LP is less compatible than the VIPLEX 530 A, but both can be improved with addition of TXIB or DOP. The use of all diester plasticizer, without the use of process oils, makes workable elastomers with very good rebound as shown in Examples 3, 5, and 10, but they are expensive. It was found that blending them at low levels with the process oils to make compatible and complement the process oils was the best way to use them. As low as approximately 6% diester plasticizer alone can be used to make a usable elastomer; see Control 14 versus Example 15.

Since the naphthenic process oils CALIFLUX LP and BEARFLEX LPO are less favorable than the high aromatic process oils like VIPLEX 530 A, either more plasticizer, see Example 6, or less oil, see Example 16, is required to make it workable. An indicator of aromaticity in a process oil is the percent hydrogen (% H) in the process oil. For example, CALIFLUX LP has 10.40% H; whereas, the more aromatic VIPLEX 530A has 8.95% H. A process oil having a % H below 10.00 would preform favorably. Compare Control 13, which is the tire fill composition taught in the Wyman '844 patent, to Example 20 and compare Controls 5, 6, 7, and 8 to Examples 1 and 2. Each type of process oil will have its preferred level of plasticizer to make it a useful tire filling elastomer. Also, process oils can be blended as in Example 12 to produce a good elastomer.

The addition of small amounts of a polyamine or water is not required, see Examples 17, 18, 20 and 21 but up to 0.5 weight %, preferably no greater than 0.4 weight % polyamine and up to 0.5 weight % water add strength to the tire filling system. In the preferred embodiment of the present invention contain no polyamine and demonstrate a very low temperature profile during the FMVSS #119 simulated road testing; see FIG. 3 and Example 21. Also, low molecular weight glycols, diols, and or triols, incorporated into the systems to increase the hardness, can be up to approximately 300 equivalent weight and make workable elastomers as shown in Example 19.

Tires filed with a prior art filling composition (Control 16) and with a composition of the present invention (Example 9) were compared in a standardized simulated road test and an actual road test. The simulated test, specified as FMVSS #119 Durability Test, was a 47 hour qualification test running against a 67.23 inch diameter (⅟₃₀₀ of a mile) drum at 50 mph (simulating 55 mph on the road) according to the following schedule: Seven hours at 70% of rated tire load, 16 hours at 88% of rated tire load, and 24 hours at 106% of rated tire load. As shown in FIG. 1, the tires filled with the system of Control 16 using MDI with a 2.1 functionality failed in 10 hours whereas tires filled with the system of Example 9 using MDI with a 2.4 functionality, passed the test. The road test consisted of placing the filled tires on a pickup truck loaded with either 1000 lbs., 2000 lbs., and 3000 lbs. and driven at 55–65 mph for up to 500 miles. The tire fill composition of Control 16 with the 2.1 functional MDI and only a 1000 lb. load had a temperature increase much faster than the fill composition of Example 9 prepared with 2.4 functional MDI having a 2000 lb. or a 3000 lb. load (FIG. 2).

In FIG. 3, the system of Control 16 is compared to the best commercially available TDI fill system, Control 3, which passed the simulated test and two systems which were fill compositions of the present invention, Examples 7 and 21. Both Examples 7 and 21 use MDI with a functionality greater than 2.3 and run cooler and thus, perform much better than Control 3. Example 21 uses no polyamine and was found to run cooler during the test, i.e., a maximum of 220° F. after 47 hours of FMVSS #119 testing, and has the best overall performance of any of the fill composition tested.

FIG. 4 compares a soft commercial TDI fill composition with a soft fill composition of the present invention. These systems were run at 35 mph, because the soft fill will not withstand the stress at 55 mph, but are used very successfully on slow moving vehicles. Again the fill composition of the present invention with greater than 2.3 functionality MDI, Example 1, runs much cooler than the commercial TDI flat proof filling composition, i.e. a maximum of 210° F. after 47 hours of FMVSS #119 testing.

The reason of Examples 7, 9, 21, and 22 were found to run cooler during the FMVSS test was due to the fact greater than 2.3 MDI compositions which resulted in having a substantially higher resiliency than the TDI compositions, Controls 1 and 3, and Control 16 i.e., the control system with the 2.1 functionality MDI. The rebound values for Examples 7, 9, 21, and 1 were 65%, 65%, 73%, and 63%, respectively. These outstanding rebound values are compared to the 46%, 48%, and 50% for Control 16, Control 1, and Control 3, respectively. The tire fill compositions of the present invention that had the higher rebound values, also had lower hysteresis. This in turn resulted in much less heat build-ups in the tire as evidenced by the much lower temperatures during the FMVSS test and overall better performance. In fact, Example 21 performed so well that the FMVSS test was continued for another 40 hours with a 10% increase in load every 8 hours until the highly overloaded tire carcass fell apart and only a maximum temperature of 270° F. was reached.

Without departing from the spirit and scope of this invention, one of ordinary skill in the art can make various changes and modifications to the invention to adapt it to various usages and conditions. As such, these changes and modifications are properly, equitably, and intended to be, within the full range of equivalents of the following claims.

What is claimed is:

1. A method for producing a deflation-proof tire which comprises: filling a pneumatic fire casing with a filling composition which comprises:
    (a) a polyisocyanate comprising polymeric diphenylmethane diisocyanate alone or blended with diphenylmethane diisocyanate or a modified diphenylmethane diisocyanate, wherein said polyisocyanate has an average functionality of greater than 2.3;
    (b) a high molecular weight polyol or blend of polyols having a hydroxyl number in the range of about 20 to about 31 and having an actual hydroxyl functionality of greater than 2.1;
    (c) from about 6 to about 65 weight % plasticizing extender oil, said extender oil having a % H below 10.00; and
    (d) no added polyamine, in the presence of a catalyst to form a polyurethane elastomer; and
curing said elastomer to produce an elastomeric filling composition within said casing having a vertical rebound of greater than about 60% based on ASTM D2632 and a Durometer hardness in the range of about 5 to 60 (Shore A).

2. The method of claim 1 wherein said extender oil comprises a mixture of a polar extender oil and a non-polar extender oil to form a compatible mixture having at least a slight positive polarity.

3. The method of claim 1 wherein said extender oil is a substantially aromatic extender oil.

4. The method of claim 1 wherein said filling composition additionally comprises up to about 0.5 weight % water.

5. The method of claim 1 wherein said filling composition additionally comprises up to about 10 weight % of a low molecular weight diol or triol.

6. The method of claim 1 wherein said filling composition additionally comprises up to about 0.5 weight % water.

7. The method of claim 5 wherein said filling composition additionally comprises up to about 0.5 weight % water.

8. The method of claim 6 wherein said filling composition additionally comprises up to about 10 weight % of a low molecular weight diol or triol.

9. The method of claim 1 wherein said isocyanate is in the range of about 3 to about 15% by weight.

10. A method for producing a deflation-proof tire which comprises: filling a pneumatic tire casing wit a filling composition which comprises:
   (a) a polyisocyanate comprising polymeric diphenylmethane dissocyanate alone or blended with diphenylmethane dissocyanate or a modified diphenylmethane diisocyanate, wherein said polyisocyanate has an average functionality of greater than about 2.3;
   (b) a high molecular weight polyol or blend of polyols having a hydroxyl number in the range of about 20 to about 31 and having an actual hydroxyl functionality of greater than 2.1;
   (c) from about 20 to about 65 weight % plasticizing extender oil, said extender oil having a % H below 10.00; and
   (d) no added polyamine, in the presence of a catalyst to form a polyurethane elastomer; and
curing said elastomer to produce an elastomeric filling composition within said casing having a vertical rebound of greater than about 70% based on ASTM D2632, a Durometer hardness in the range of about 10 to 60 (Shore A), and a maximum temperature of no greater than 240 EF after 47 hours of the Federal Motor Vehicle Safety Standard #119 Durability Test.

11. The method of claim 10 wherein said extender oil comprises a mixture of a polar extender oil and a non-polar extender oil to form a compatible mixture having at least a slight positive polarity.

12. The method of claim 10 wherein said extender oil is a substantially aromatic extender oil.

13. The method of claim 10 wherein said filling composition additionally comprises up to about 0.5 weight % water.

14. The method of claim 10 wherein said filling composition additionally comprises up to about 10 weight % of a low molecular weight diol or triol.

15. The method of claim 10 wherein said filling composition additionally comprises up to about 0.5 weight % water.

16. The method of claim 14 wherein said filling composition additionally comprises up to about 0.5 weight % water.

17. The method of claim 15 wherein said filling composition additionally comprises up to about 10 weight % of a low molecular weight diol or triol.

18. The method of claim 10 wherein said isocyanate is in the range of about 3 to about 15% by weight.

* * * * *